(12) United States Patent
Song et al.

(10) Patent No.: US 10,651,746 B2
(45) Date of Patent: May 12, 2020

(54) SYNCHRONOUS RECTIFIER CONTROL FOR A FLYBACK CONVERTER WITH AN ACTIVE CLAMP

(71) Applicant: DELTA ELECTRONICS, INC., Taoyuan (TW)

(72) Inventors: Hai-Bin Song, Taoyuan (TW); Dao-Fei Xu, Taoyuan (TW); Jian Zhou, Taoyuan (TW); Le-Yang Yang, Taoyuan (TW); Qi Fu, Taoyuan (TW); Jin-Fa Zhang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/803,861

(22) Filed: Nov. 6, 2017

(65) Prior Publication Data

US 2018/0131286 A1 May 10, 2018

(30) Foreign Application Priority Data

Nov. 7, 2016 (CN) .......................... 2016 1 0976793

(51) Int. Cl.
*H02M 3/335* (2006.01)
*H02M 1/34* (2007.01)

(52) U.S. Cl.
CPC .. *H02M 3/33592* (2013.01); *H02M 2001/342* (2013.01); *Y02B 70/1475* (2013.01); *Y02B 70/1491* (2013.01)

(58) Field of Classification Search
CPC ... H02M 3/335–42; H02M 2001/0009; H02M 2001/342; Y02B 70/1475; Y02B 70/1491
See application file for complete search history.

(56) References Cited

U.S. PATENT DOCUMENTS 5,430,633 A * 7/1995 Smith ............... H02M 3/33569
363/131
5,734,563 A * 3/1998 Shinada ............ H02M 3/33592
363/127

(Continued)

FOREIGN PATENT DOCUMENTS

CN 101572490 A 11/2009
CN 102307017 A 1/2012

(Continued)

*Primary Examiner* — Daniel Kessie
*Assistant Examiner* — Peter M Novak
(74) *Attorney, Agent, or Firm* — CKC & Partners Co., LLC (57) ABSTRACT

A converter includes a transformer, a main switch, an active clamping circuit, a synchronous rectifying switch and a processing circuit. The transformer includes a primary winding and a secondary winding. The main switch is coupled to the primary winding. The active clamping circuit clamps the voltage across the main switch when it is OFF. The active clamping circuit includes an auxiliary switch. The synchronous rectifying switch is coupled to the secondary winding. The processing circuit determines whether the rectifying switch is in a main conducting period or a sub conducting period according to a first voltage signal across the rectifying switch and at least one detecting signal from the converter, and generates a driving signal to control the synchronous rectifying switch accordingly.

17 Claims, 9 Drawing Sheets

(56) References Cited

U.S. PATENT DOCUMENTS

| | | | |
|---|---|---|---|
| 5,991,171 A * | 11/1999 | Cheng | H02M 3/33507 363/21.03 |
| 6,856,522 B1 | 2/2005 | Wittenbreder, Jr. | |
| 6,947,297 B2 | 9/2005 | Ke et al. | |
| 6,995,991 B1 * | 2/2006 | Yang | H02M 3/33592 363/21.14 |
| 7,558,082 B2 * | 7/2009 | Jitaru | H02M 3/33523 363/21.06 |
| 9,954,456 B2 * | 4/2018 | Xue | H02M 1/083 |
| 2005/0174811 A1 | 8/2005 | Liu et al. | |
| 2009/0109711 A1 * | 4/2009 | Hsu | H02M 3/33592 363/21.14 |
| 2009/0147546 A1 | 6/2009 | Grande et al. | |
| 2010/0067259 A1 | 3/2010 | Liu | |
| 2013/0121038 A1 * | 5/2013 | Ryu | H02J 3/383 363/21.14 |
| 2014/0185333 A1 | 7/2014 | Yang | |
| 2016/0233779 A1 * | 8/2016 | Cohen | H02M 3/33592 |
| 2017/0244333 A1 * | 8/2017 | Choi | H02M 1/08 |
| 2018/0287481 A1 * | 10/2018 | Liu | H02M 1/083 |

FOREIGN PATENT DOCUMENTS

| | | |
|---|---|---|
| CN | 103795260 A | 5/2014 |
| CN | 102307017 B | 9/2014 |
| CN | 104300795 A | 1/2015 |
| TW | 200735516 A | 9/2007 |
| TW | 200816613 A | 4/2008 |

* cited by examiner

SYNCHRONOUS RECTIFIER CONTROL FOR A FLYBACK CONVERTER WITH AN ACTIVE CLAMP

RELATED APPLICATIONS

This application claims priority to China Application Serial Number 201610976793.X, filed Nov. 7, 2016, which is herein incorporated by reference.

BACKGROUND

Technical Field

The present disclosure relates to a converter, and in particular, to a flyback converter.

Description of Related Art

Flyback converters are widely applied in low power applications, especially in power devices lower than 100 W, due to characteristics of a simple circuit structure, electrical isolation between the input and output stage, and low cost.

With the widespread use of switching power supplies in portable devices such as notebooks, tablets, and smartphones in recent years, there is a trend to develop switching power supplies with smaller sizes, higher efficiency and higher frequency.

However, the leakage loss of the transformer and the turn-on loss of the main switch limit the development of the Flyback converter with smaller sizes and a higher frequency.

SUMMARY

One aspect of the present disclosure is a converter. The converter includes a transformer, a main switch, an active clamping circuit, a synchronous rectifying switch, and a processing circuit. The transformer includes a primary winding and a secondary winding. The main switch is electrically coupled to the primary winding. The active clamping circuit is configured to clamp the voltage across the main switch. The active clamping circuit includes an auxiliary switch. The synchronous rectifying switch is electrically coupled to the secondary winding. The processing circuit is configured to determine whether the synchronous rectifying switch is in a main conducting period or a sub conducting period according to a first voltage signal across the synchronous rectifying switch and at least one detecting signal from the converter, and generate a driving signal to control the synchronous rectifying switch accordingly.

Another aspect of the present disclosure is a control method for a converter. The control method includes: providing a delaying unit to receive and delay at least one detecting signal from the converter to output at least one sensing signal; providing a logic unit to receive the sensing signal and a first voltage signal across a synchronous rectifying switch, and output a state signal indicating the synchronous rectifying switch is in a main conducting period or a sub conducting period; providing a state latch unit to receive and store the state signal; and providing a driving signal generating unit to generate a driving signal according to the state signal and the first voltage signal to control the synchronous rectifying switch.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
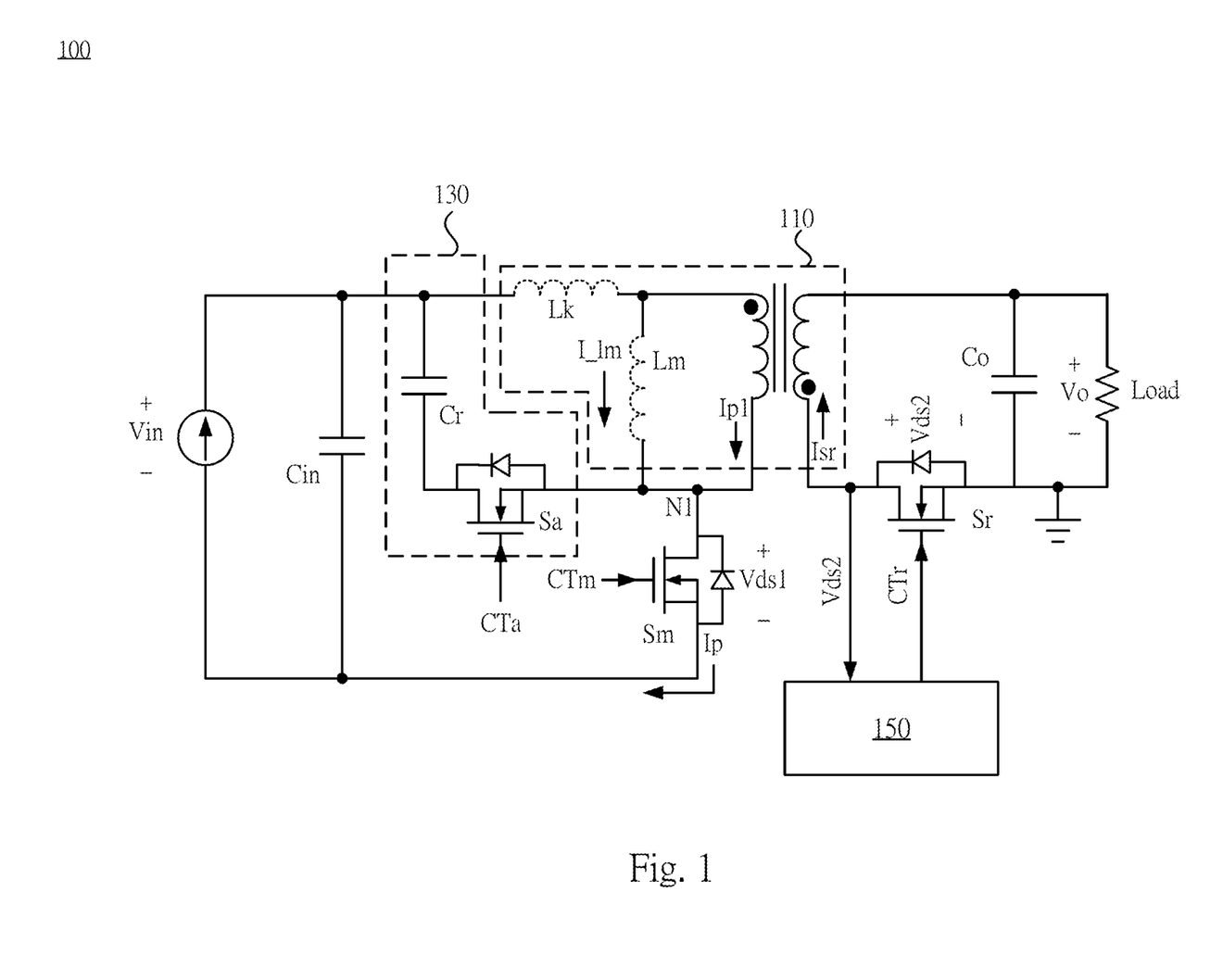
FIG. 1 is a diagram illustrating a converter according to some embodiments of the present disclosure.

Reference is made to FIG. 1. FIG. 1 is a diagram illustrating a converter 100 according to some embodiments of the present disclosure. As depicted in FIG. 1, the converter 100 is configured to convert an input voltage Vin received from an input voltage source to an output voltage Vo. The output voltage Vo is supplied to a load. In some embodiments, the converter 100 may be a flyback converter. Specifically, in some embodiments. The converter 100 is an active clamp flyback converter.

As depicted in FIG. 1, in some embodiments, the converter 100 includes a transformer 110, an active clamping circuit 130, a processing circuit 150, a main switch Sm, a synchronous rectifying switch Sr, an input capacitor Cin, and an output capacitor Co. In some embodiments, the active clamping circuit 130 includes an auxiliary switch Sa.

As depicted in FIG. 1, the main switch Sm is electrically coupled to the primary winding of the transformer 110 at a node N1. Specifically, in some embodiments, the first terminal of the main switch Sm is electrically coupled to the second terminal of the primary winding of the transformer 110. The second terminal of the main switch Sm is electrically coupled to the second terminal of the input capacitor Cin. The control terminal of the main switch Sm is configured to receive a main switch control signal CTm. The main switch control signal CTm is configured to selectively turn on or turn off the main switch Sm. For example, in some embodiments, when the main switch control signal CTm is at a first level (e.g., a high level), the main switch Sm is turned on. On the other hand, when the main switch control signal CTm is at a second level (e.g., a low level), the main switch Sm is turned off.

Specifically, when the main switch Sm is turned on, the transformer 110 will gradually generate a magnetizing current I_Im flowing through the primary winding, and the energy is correspondingly stored in the transformer 110. The polarities of the primary winding and the secondary winding are different, and the synchronous rectifying switch Sr remains off. Thus no energy is transmitted from the primary winding to the secondary winding. The output voltage Vo is maintained by the output capacitor Co. Alternatively stated, the output capacitor Co is electrically coupled to the secondary winding and the synchronous rectifying switch Sr, and provides the energy to the load when the synchronous rectifying switch Sr is off.

On the other hand, when the main switch Sm is off, the polarities of the windings reverse and the synchronous rectifying switch Sr is turned on. The magnetizing current I_Im is transferred from the primary winding to the secondary winding. This period is the main conducting period of the synchronous rectifying switch Sr. As the current Isr flowing through the synchronous rectifying switch Sr, the energy stored in the transformer 110 is transferred to the output capacitor Co and the load.

In some embodiments, the active clamping circuit 130 is electrically coupled to the first terminal of the input capacitor Cin and the node N1, and configured to clamp the voltage across the main switch Sm when the main switch Sm is off. Specifically, the active clamping circuit 130 may include an auxiliary switch Sa and a clamping capacitor Cr. The first terminal of the auxiliary switch Sa is electrically coupled to the main switch Sm at the node N1. The control terminal of the auxiliary switch Sa is configured to receive the auxiliary switch control signal CTa. In some embodiments, the first terminal of the clamping capacitor Cr is electrically coupled to the first terminal of the input capacitor Cin and the primary winding. The second terminal of the clamping capacitor Cr is electrically coupled to the second terminal of the auxiliary switch Sa. The active clamping circuit 130 is coupled to two terminals of the primary winding in parallel.

It is noted that, in some other embodiments, the active clamping circuit 130 may also be electrically coupled to the two terminals of the main switch Sm in parallel, and configured to clamp the voltage across the main switch Sm when the main switch Sm is off. In addition, in various embodiments, the auxiliary switch Sa and the clamping capacitor may also exchange the locations of each other. For example, in some embodiments, the first terminal of the clamping capacitor Cr is electrically coupled to the main switch Sm at the node N1. The first terminal of the auxiliary switch Sa is electrically coupled to the positive terminal of the input voltage and the primary winding. The second terminal of the clamping capacitor Cr is electrically coupled to the second terminal of the auxiliary switch Sa. The control terminal of the auxiliary switch Sa is configured to receive the auxiliary switch control signal CTa. Therefore, the circuit illustrated in FIG. 1 is merely an example and not meant to limit the present disclosure.

When the main conducting period of the synchronous rectifying switch Sr is finished, the auxiliary switch Sa is turned on, and the voltage across the magnetizing inductance Lm and the leakage inductance Lk will be clamped to the voltage of the clamping capacitor Cr. And the energy in the leakage inductance Lk is stored in the clamping capacitor Cr. At the time, the synchronous rectifying switch Sr conducts again, and the current Isr will flow through the synchronous rectifying switch Sr. Accordingly, the energy of the leakage inductance Lk is recycled and transferred to the output capacitor Co and the load. The period is the sub conducting period of the synchronous rectifying switch Sr.

Alternatively stated, in the embodiments shown in FIG. 1, during one switching cycle, the synchronous rectifying switch Sr is turned on in the main conducting period and the sub conducting period. In the turned-on periods of the synchronous rectifying switch Sr, no matter in the main conducting period or the sub conducting period, the main switch Sm remains off. If the main switch Sm and the synchronous rectifying switch Sr are on at the same time, the primary side and the secondary side of the transformer 110 will both be conducted, which results in the burn out of the power supply.

In some embodiments, the processing circuit 150 is electrically coupled to the synchronous rectifying switch Sr. And according to a voltage signal Vds2 across the synchronous rectifying switch Sr (i.e., the voltage across the source terminal and the drain terminal), the processing circuit 150 determines whether the synchronous rectifying switch Sr is in the main conducting period or the sub conducting period.

And the processing circuit 150 correspondingly generates the driving signal CTr to control the synchronous rectifying switch Sr.

Figure 2:
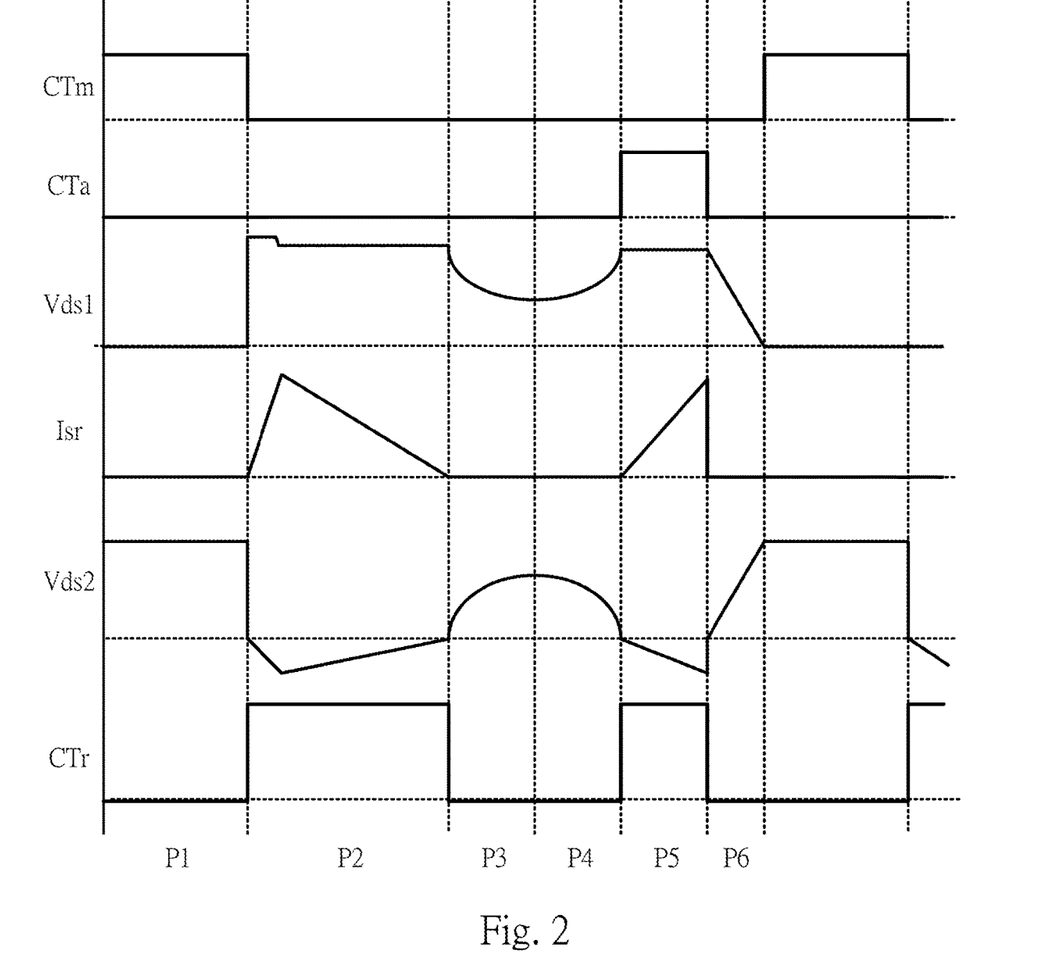
FIG. 2 is a waveform diagram illustrating the voltage and the current signals of the converter according to some embodiments of the present disclosure.

FIG. 2 is a waveform diagram illustrating the voltage and the current signals of the converter 100 according to some embodiments of the present disclosure. With respect to the embodiments of FIG. 1, like elements in FIG. 2 are designated with the same reference numbers for ease of understanding. As depicted in FIG. 2, periods P1-P6 are included in a switching cycle. In the period P1, the main switch control signal CTm is at the high level, and the main switch Sm is on. Thus, the voltage signal Vds1 across the main switch Sm is about zero. At the time, the driving signal CTr is at the low level, and the synchronous rectifying switch Sr remains off. Thus, the current Isr is zero, and the voltage signal Vds2 across the synchronous rectifying switch Sr is at high level.

Next, in the period P2, the main switch control signal CTm is switched from a high level to a low level, and the main switch Sm is turned off correspondingly. Thus the voltage signal Vds1 across the main switch Sm is at high level. At the time, the current Isr is raised to the positive value quickly, the driving signal CTr is correspondingly switched from the low level to the high level, and the synchronous rectifying switch Sr conducts. The polarity of the voltage across the synchronous rectifying switch Sr is reversed, which means the voltage signal Vds2 is switched to the negative value. As the energy stored in the transformer 110 is transferred to the load, the current Isr gradually decreases from maximum to zero, and the voltage signal Vds2 also reduces to zero. The waveforms of the period P2 show the changes of the voltage signals and the current signals of the synchronous rectifying switch Sr in the main conducting period.

Next, in the periods P3, P4, the main switch control signal CTm, the auxiliary switch control signal CTa and the driving signal CTr are all at the low level, and the main switch Sm, the auxiliary switch Sa, and the synchronous rectifying switch Sr are all off. At the time, the current Isr is zero. The parasitic capacitors of the main switch Sm and the synchronous rectifying switch Sr and the magnetizing inductances Lm resonate, which causes the voltage signals Vds1 and Vds2 to resonate correspondingly.

Next, in the period P5, the main switch control signal CTm is maintained at the low level. The auxiliary switch control signal CTa is switched from the low level to the high level correspondingly, the auxiliary switch Sa is turned on, and the active clamping circuit 130 clamps the voltage across the main switch Sm. Alternatively stated, the active clamping circuit 130 clamps the voltage signal Vds1 at the high level according to the voltage of the clamping capacitor Cr and the input voltage Vin. At the time, the current Isr is positive, the driving signal CTr is also switched from the low level to the high level, the synchronous rectifying switch Sr is turned on, and the voltage signal Vds2 is switched to the negative value again. The waveforms of the period P5 show the changes of the voltage signals and the current signals of the synchronous rectifying switch Sr in the sub conducting period.

Next, in the period P6, the auxiliary switch control signal CTa is switched from the high level to the low level, the auxiliary switch Sa is turned off correspondingly, the voltage signal Vds1 gradually decreases from the high level to zero, and the voltage signal Vds2 gradually rises from zero to the high level. The driving signal CTr is also switched from the high level to the low level, and the synchronous rectifying switch Sr is turned off. The magnetizing current I_Im of the primary side is negative, and the parasitic capacitor of the main switch Sm is discharged. The voltage signal Vds1 across the main switch Sm will gradually decrease to zero to achieve the zero voltage turn-on.

By repeating the operations during the periods P1-P6, the main switch Sm, the synchronous rectifying switch Sr, and the auxiliary switch Sa may be controlled to be on or off, and the converter 100 converts the input voltage Vin to the output voltage Vo. The output voltage Vo is supplied to the load.

As the voltage waveforms shown in FIG. 2, in the main conducing period (i.e., period P2) and the sub conducing period (i.e., period P5), the voltage signal Vds2 are both negative. In the period P1, the voltage signal Vds2 remains at the high voltage. Specifically, in the period P1, the magnitude of the voltage signal Vds2 is (Vin/n+Vo). And n denotes the ratio of the primary winding and the secondary winding. Alternatively stated, in the period P1, the value of the voltage signal Vds2 is larger than the value of the output voltage Vo. On the other hand, in the periods P3 and P4, the voltage signal Vds2 is a sinusoidal waveform, and its value is near to zero before entering into the period P5, which is smaller than the value of the output voltage Vo.

Since the body diode exists in the synchronous rectifying switch Sr, the value of the voltage signal Vds2 becomes negative before the synchronous rectifying switch Sr is turned on. Therefore, the processing circuit 150 may determine whether the synchronous rectifying switch Sr is in the main conducting period or the sub conducting period according to the voltage signal Vds2 and the value of the voltage signal Vds2 before its polarity reverses. And the processing circuit 150 correspondingly generates the driving signal CTr to control the synchronous rectifying switch Sr.

Figure 3:
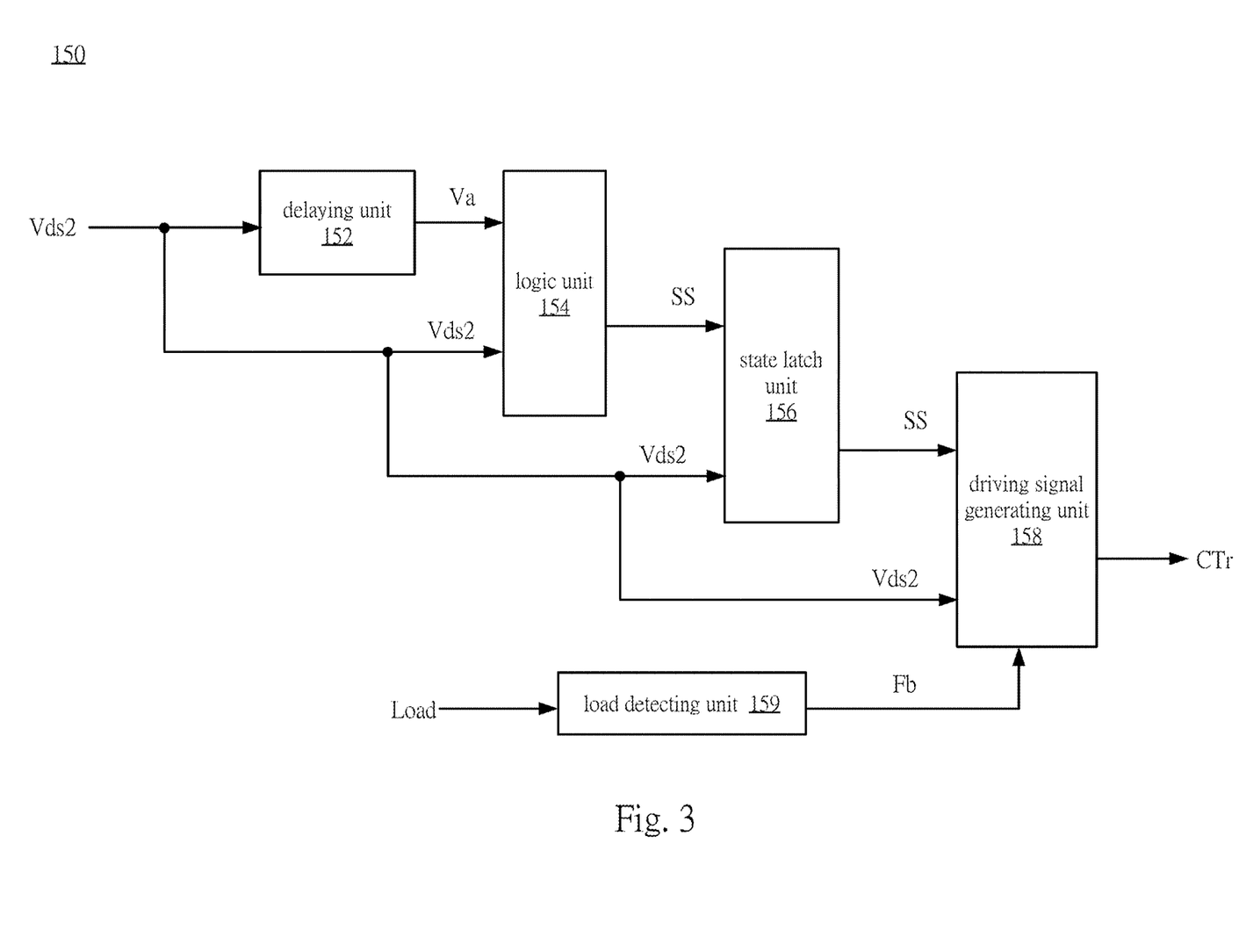
FIG. 3 is a diagram illustrating the processing circuit according to some embodiments of the present disclosure.

In order to further explain the detailed operation of the processing circuit 150, reference is made to FIG. 3. FIG. 3 is a diagram illustrating the processing circuit 150 according to some embodiments of the present disclosure. As shown in FIG. 3, the processing circuit 150 includes a delaying unit 152, a logic unit 154, a state latch unit 156, a driving signal generating unit 158 and a load detecting unit 159.

The delaying unit 152 is configured to receive and delay the voltage signal Vds2 to output a sensing signal Va. Since the sensing signal Va is obtained by delaying the voltage signal Vds2, the value of the sensing signal Va stands for the value of the voltage signal Vds2 at previous time. When the polarity of the voltage signal Vds2 is switched from positive to negative, the value of the sensing signal Va is still positive.

The logic unit 154 is electrically coupled to the delaying unit 152, and configured to output a state signal SS. The state signal SS indicates the synchronous rectifying switch Sr is in the main conducting period or in the sub conducting period. Specifically, as shown in FIG. 3, the logic unit 154 receives the voltage signal Vds2 and the sensing signal Va. The logic unit 154 compares the sensing signal Va with the output voltage Vo when the voltage signal Vds2 is negative.

When the value of the sensing signal Va is larger than the value of the output voltage Vo, the logic unit 154 indicates the synchronous rectifying switch Sr is in the main conducting period (i.e., period P2). When the value of the sensing signal Va is smaller than the value of the output voltage Vo, the logic unit 154 indicates the synchronous rectifying switch Sr is in the sub conducting period (i.e., period P5).

The state latch unit 156 is electrically coupled to the logic unit 154, and configured to receive and store the state signal SS. The driving signal generating unit 158 is electrically coupled to the state latch unit 156, and configured to generate the corresponding driving signal CTr according to the state signal SS and the voltage signal Vds2. One skilled in the art can understand the control of the synchronous rectifying switch Sr in the main conducting period, so the detailed explanation is omitted herein for the sake of brevity. In the following paragraph the control of the synchronous rectifying switch Sr in the sub conducting period will be discussed.

The load detecting unit 159 is electrically coupled to the load side of the converter 100, and configured to detect the load state. The load detecting unit 159 outputs the load state signal Fb which indicates the current load is heavy or light. The driving signal generating unit 158 is also electrically coupled to the load detecting unit 159 and configured to receive the load state signal Fb. When the synchronous rectifying switch Sr is in the sub conducting period, the driving signal generating unit 158 enables or disables the driving signal CTr according to the load state signal Fb. Specifically, when the load state signal Fb indicates the load of the converter is heavy, the driving signal generating unit 158 enables the driving signal CTr. The driving signal CTr for the sub conducting period controls the synchronous rectifying switch Sr to conduct for a given conducting time T. For example, the conducting time T is smaller than or equal to the conducting time of the auxiliary switch Sa. That is to say the pulse width of the driving signal CTr is smaller than or equal to the pulse width of the auxiliary switch driving signal CTa. When the load state signal Fb indicates the load of the converter is light, the driving signal generating unit 158 disables the driving signal CTr. The synchronous rectifying switch Sr keeps off during the sub conducting period. Of course, the present disclosure is not limited thereto. According to actual needs, when the load state signal Fb indicates the load of the converter is light, the driving signal generating unit 158 may also enable the driving signal CTr. The driving signal CTr controls the synchronous rectifying switch Sr to conduct for a given conducting time, during the sub conducting period. Alternatively stated, in some embodiments, the processing circuit 150 determines whether the synchronous rectifying switch Sr is in the main conducting period or the sub conducting period. When the synchronous rectifying switch Sr is in the sub conducting period, the processing circuit 150 generates the driving signal with given pulse width, and determines whether the driving signal is enabled or disabled according to the load state.

Further, in some embodiments, during the sub conducting period, the driving signal CTr of the synchronous rectifying switch Sr has a given pulse width. The given pulse width may be fixed. For example, the pulse width is smaller than or equal to the pulse width of the auxiliary switch driving signal CTa. The given pulse width may also be adjustable. The given pulse width is adjusted according to actual circumstances, such as the variation of the input voltage Vin and the output voltage Vo.

In addition, in some embodiments, the processing circuit 150 may determine whether the synchronous rectifying switch Sr is in the main conducting period or the sub conducting period according to the voltage signal Vds2 and the detecting signal from the converter 100. And the processing circuit 150 correspondingly generates the driving signal CTr to control the synchronous rectifying switch Sr. The state of the detecting signal before the synchronous rectifying switch Sr entering the main conducting period is different from the state of the detecting signal before the synchronous rectifying switch Sr entering the sub conducting period.

Figure 4:
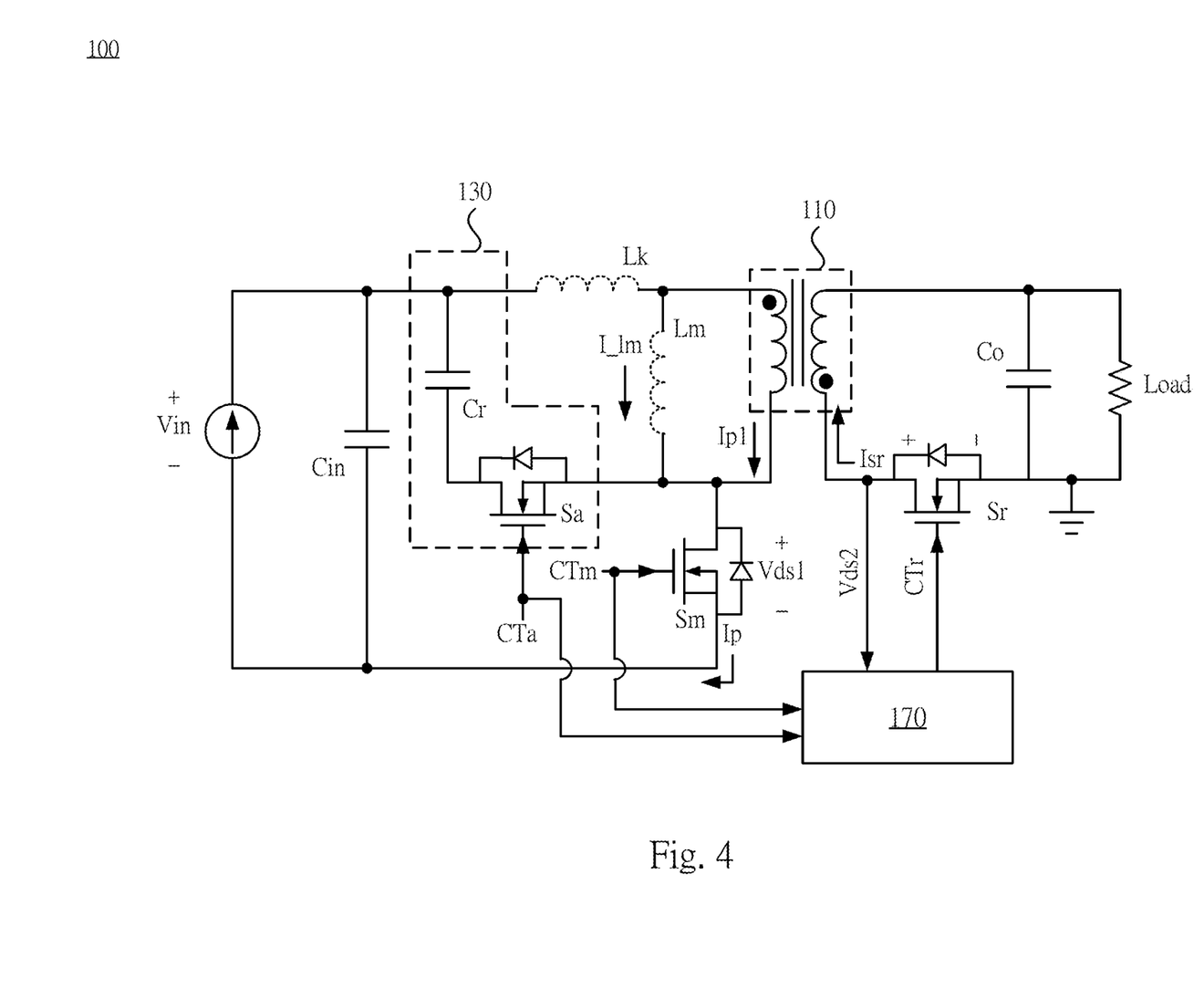
FIG. 4 is a diagram illustrating the converter according to some other embodiments of the present disclosure.

Reference is made to FIG. 4. FIG. 4 is a diagram illustrating the converter 100 according to some other embodiments of the present disclosure. With respect to the embodiments of FIG. 1, like elements in FIG. 4 are designated with the same reference numbers for ease of understanding.

Compared to the embodiments shown in FIG. 1, in the present embodiment, the converter includes a processing circuit 170. The processing circuit 170 determines whether the synchronous rectifying switch Sr is in the main conducting period or in the sub conducting period according to the voltage signal Vds2, the main switch control signal CTm and the auxiliary switch control signal CTa. Alternatively stated, in the present embodiment, the main switch control signal CTm and the auxiliary switch control signal CTa are the detecting signals from the converter 100.

Reference is made to FIG. 2 again. As the voltage waveforms depicted in FIG. 2, in the main conducting period (i.e., period P2) and the sub conducting period (i.e., period P5), the voltage signal Vds2 is negative. However, when switching from the period P1 to the period P2, the main switch control signal CTm is switched from the high level to the low level. On the other hand, when switching from the period P4 to the period P5, the auxiliary switch control signal CTa is switched from the low level to the high level, and the main switch control signal CTm keeps at low level. Alternatively stated, the states of the main switch control signal CTm and the auxiliary switch control signal CTa before the synchronous rectifying switch Sr entering the main conducting period are different from that before the synchronous rectifying switch Sr entering the sub conducting period. Therefore, the processing circuit 170 may determine whether the synchronous rectifying switch Sr is in the main conducting period or the sub conducting period according to the main switch control signal CTm and the auxiliary switch control signal CTa.

Figure 5:
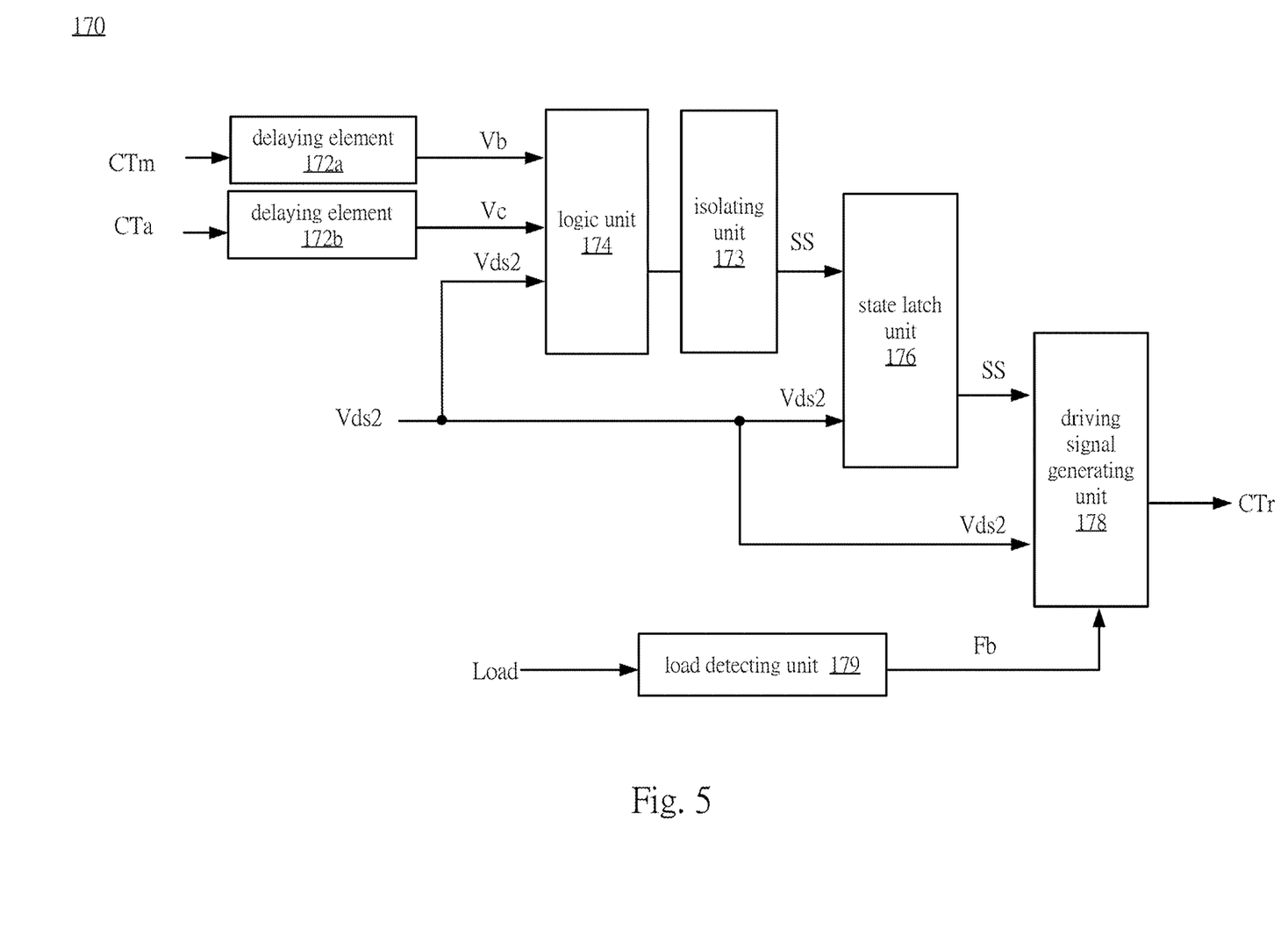
FIG. 5 is a diagram illustrating the processing circuit according to some embodiments of the present disclosure.

Reference is made to FIG. 5. FIG. 5 is a diagram illustrating the processing circuit 170 according to some embodiments of the present disclosure. As shown in FIG. 5, the process circuit 170 includes delay elements 172a, 172b, the logic unit 174, the isolating unit 173, the state latch unit 176, the driving signal generating unit 178 and the load detecting unit 179.

The delay elements 172a, 172b are configured to respectively receive the main switch control signal CTm and the auxiliary switch control signal CTa. And the main switch control signal CTm and the auxiliary switch control signal CTa are delayed to respectively output sensing signals Vb, Vc. Since the sensing signals Vb, Vc are obtained by delaying the main switch control signal CTm and the auxiliary switch control signal CTa, the voltage values of the sensing signals Vb, Vc may indicate the voltage values of the main switch control signal CTm and the auxiliary switch control signal CTa at previous time.

The logic unit 174 is electrically coupled to the delay elements 172a, 172b, and configured to generate the state signal SS. The state signal SS indicates the synchronous rectifying switch Sr is in the main conducting period or in the sub conducting period. The logic unit 174 receives the sensing signals Vb, Vc and the voltage signal Vds2. In some embodiments, the logic unit 174 compares the voltage value of the sensing signal Vb with zero when the voltage signal Vds2 is negative. And the logic unit 174 compares the voltage value of the sensing signal Vc with zero when the voltage signal Vds2 is negative.

As depicted in FIG. 2, specifically, since the main switch control signal CTm has the high level at the previous time, the voltage value of the sensing signal Vb is positive. When the voltage signal Vds2 is negative and the voltage value of the sensing signal Vb is positive, the logic unit 174 determines the synchronous rectifying switch Sr is in the main conducting period (i.e., period P2). Since the auxiliary switch control signal CTa has low level at the previous time, the voltage value of the sensing signal Vc is zero. The main switch control signal CTm has the low level at the previous time, so the voltage value of the sensing signal Vb is zero. When the voltage values of the sensing signal Vb and the sensing signal Vc are both zero and the voltage signal Vds2 is negative, the logic unit 174 determines the synchronous rectifying switch Sr is in the sub conducting period (i.e., period P5).

The isolating unit 173 is electrically connected to the logic unit 174, and configured to isolate the primary side and the secondary side of the processing circuit 170. And the isolating unit 173 transmits the state signal SS to the secondary side of the converter 100.

The state latch unit 176 is electrically coupled to the isolating unit 173, and configured to receive and store the state signal SS. The driving signal generating unit 178 is electrically coupled to the state latch unit 176, and configured to generate the driving signal CTr according to the state signal SS and the voltage signal Vds2. The load detecting unit 179 outputs the load state signal Fb. When the synchronous rectifying switch Sr is in the sub conducting period, the driving signal generating unit 178 may enable or disable the driving signal CTr of the synchronous rectifying switch Sr according to the load state signal Fb. The driving signal CTr controls the synchronous rectifying switch Sr to be on or off during the sub conducting period.

Since the specific operations of the processing circuit 170 and the driving signal CTr in the sub conducting period are similar to the processing circuit 150, further explanation is omitted herein for the sake of brevity.

Figure 6:
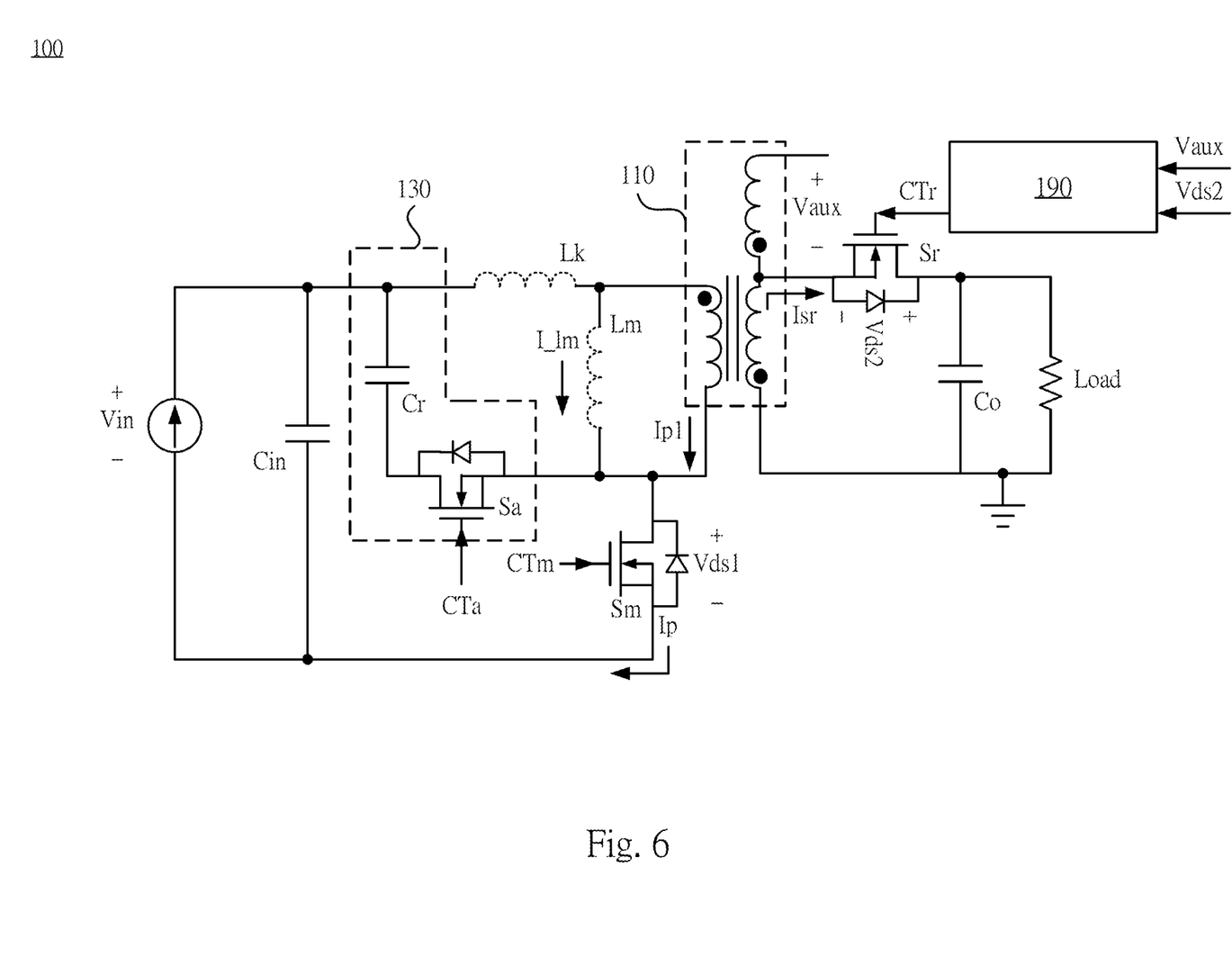
FIG. 6 is a diagram illustrating the converter according to some other embodiments of the present disclosure.

Reference is made to FIG. 6. FIG. 6 is a diagram illustrating the converter 100 according to some other embodiments of the present disclosure. With respect to the embodiments of FIG. 1 and FIG. 4, like elements in FIG. 6 are designated with the same reference numbers for ease of understanding.

Compared to the embodiments illustrated in FIG. 1 and FIG. 4, in the present embodiment, the converter 100 includes the processing circuit 190.

As depicted in FIG. 6, the transformer 110 includes the primary winding, the secondary winding and an auxiliary winding. The auxiliary winding is electrically connected to the secondary winding. In the present embodiment, the processing circuit 190 is further configured to determine whether the synchronous rectifying switch Sr is in the main conducting period or the sub conducting period according to an auxiliary winding voltage signal Vaux.

Figure 7:
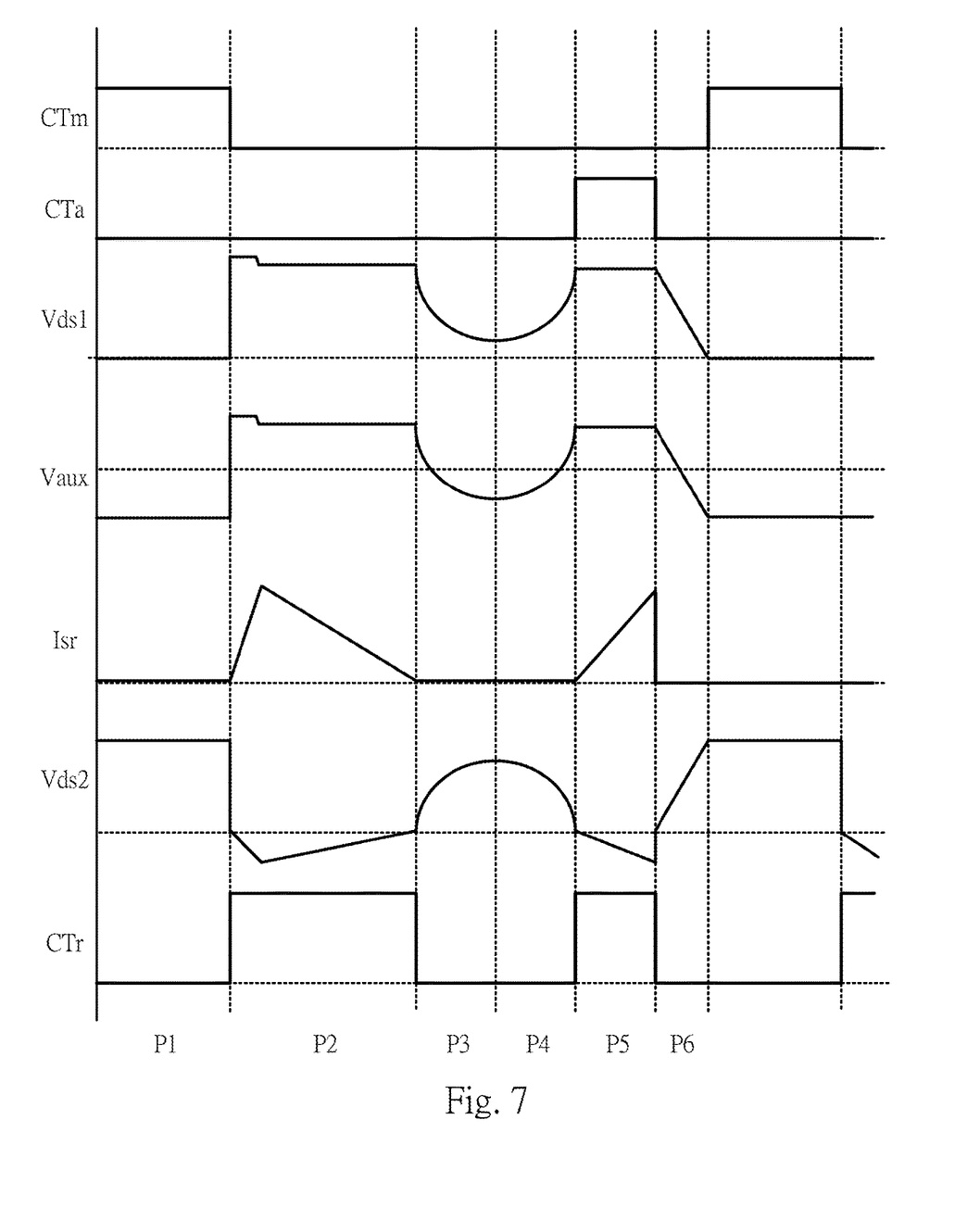
FIG. 7 is a waveform diagram illustrating the voltage and the current signals of the converter according to some embodiments of the present disclosure.

Reference is made to FIG. 7. FIG. 7 is a waveform diagram illustrating the voltage signals and the current signals of the converter 100 according to some embodiments of the present disclosure. With respect to the embodiments of FIG. 2, like elements in FIG. 7 are designated with the same reference numbers for ease of understanding.

Compared to the embodiments shown in FIG. 2, the changes of the auxiliary winding voltage signal Vaux during the period P1-P6 are illustrated in the FIG. 7. As depicted in FIG. 7, since the polarities of the primary winding and the auxiliary winding are opposite, in the period P1, the auxiliary winding voltage signal Vaux maintains at the negative level. Next, in the period P2, as the polarities of the windings are reversed, the auxiliary winding voltage signal Vaux is changed from negative to positive correspondingly. Next, in the periods P3 and P4, as the synchronous rectifying switch Sr is off, the auxiliary winding voltage signal Vaux starts to resonate. Specifically, the auxiliary winding voltage signal Vaux varies between a positive level and a negative level.

In the period P5, as the synchronous rectifying switch Sr conducts, the auxiliary winding voltage signal Vaux keeps at the positive level (high level). Finally, in the period P6, as the synchronous rectifying switch Sr is turned off again, the auxiliary winding voltage signal Vaux gradually decreases from positive to negative.

In the FIG. 7, the changes of the voltage signals Vds1 and Vds2, the main switch control signal CTm, the auxiliary switch control signal CTa, the driving signal CTr and the current Isr in the periods P1-P6 are discussed in detailed in the above paragraphs and embodiments, which are omitted herein for the sake of brevity.

As shown in FIG. 7, during the main conducting period and the sub conducting period, the voltage signal Vds2 is negative. However, before entering into the period P2, the auxiliary winding voltage signal Vaux is negative. On the other hand, before entering into the period P5, the auxiliary winding voltage signal Vaux is positive. Alternatively stated, the state of the auxiliary winding voltage signal Vaux before the synchronous rectifying switch Sr entering the main conducting period is different from that before the synchronous rectifying switch Sr entering the sub conducting period. Thus, the processing circuit 190 may determine whether the synchronous rectifying switch Sr is in the main conducting period or the sub conducting period according to the voltage signal Vds2 and the polarity of the auxiliary winding voltage signal Vaux. And the processing circuit 190 generates the driving signal CTr correspondingly to control the synchronous rectifying switch Sr.

Figure 8:
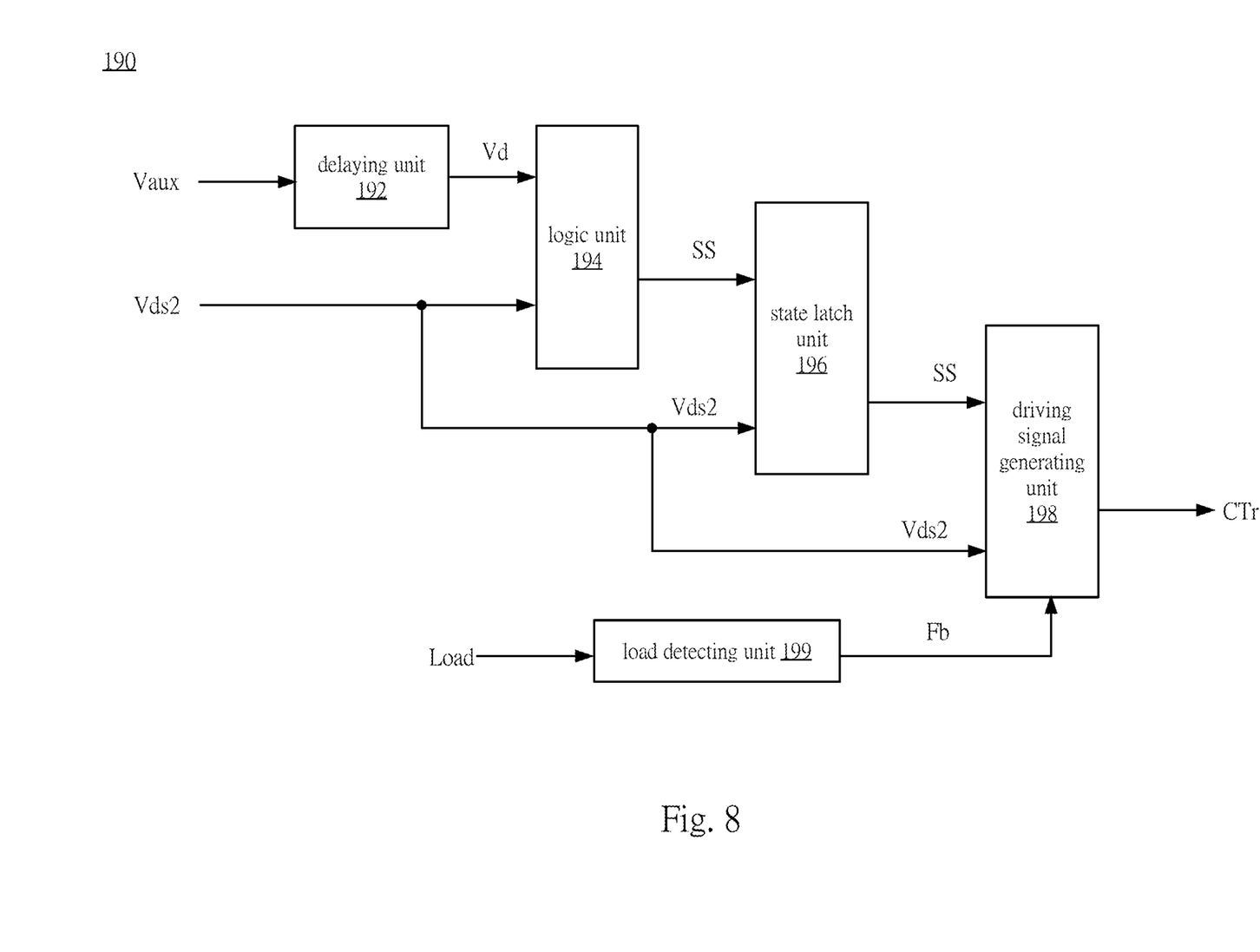
FIG. 8 is a diagram illustrating the processing circuit according to some embodiments of the present disclosure.

To further explain the specific operation of the processing circuit 190, reference is made to FIG. 8. FIG. 8 is a diagram illustrating the processing circuit 190 according to some embodiments of the present disclosure. As shown in FIG. 8, the process circuit 190 includes the delaying unit 192, the logic unit 194, the state latch unit 196, the driving signal generating unit 198 and the load detecting unit 199.

The delaying unit 192 is configured to receive and delay the auxiliary winding voltage signal Vaux to output the sensing signal Vd. Since the sensing signal Vd is obtained by delaying the auxiliary winding voltage signal Vaux, the value of the sensing signal Vd may indicate the value of the auxiliary winding voltage signal Vaux at previous time.

The logic unit 194 is electrically coupled to the delaying unit 192, and configured to generate the state signal SS. The state signal SS indicates the synchronous rectifying switch Sr is in the main conducting period or in the sub conducting period. Specifically, as shown in the drawing, the logic unit 194 receives the voltage signal Vds2 and the sensing signal Vd, and judges the polarity of the sensing signal Vd when the voltage signal Vds2 is negative.

As depicted in FIG. 7, if the auxiliary winding voltage signal Vaux at previous time is negative, the sensing signal Vd will be negative. And when the sensing signal Vd and the voltage signal Vds2 are both negative, the logic unit 194 determines the synchronous rectifying switch Sr is in the main conducting period (i.e., period P2). If the auxiliary winding voltage signal Vaux at previous time is positive, the sensing signal Vd will be positive. And when the voltage signal Vds2 is negative and the sensing signal Vd is positive, the logic unit 194 determines the synchronous rectifying switch Sr is in the sub conducting period (i.e., period P5).

The state latch unit 196 is electrically coupled to the logic unit 194, and configured to receive and store the state signal SS. The driving signal generating unit 198 is electrically coupled to the state latch unit 196, and configured to generate the driving signal CTr with corresponding duty cycle according to the state signal SS and the voltage signal Vds2. The load detecting unit 199 outputs the load state signal Fb. When the synchronous rectifying switch Sr is determined to be in the sub conducting period, the driving signal generating unit 198 may enable or disable the driving signal CTr according to the load state signal Fb.

Since the specific operations of the processing circuit 190 and the driving signal CTr in the secondary conducting period are similar to the processing circuits 150 and 170, further explanation is omitted herein for the sake of brevity.

In some embodiments, the processing circuit determines whether the synchronous rectifying switch Sr is in the main conducting period or the sub conducting period. When the synchronous rectifying switch Sr is in the main conducting period, the driving signal CTr is generated based on the existing method. However, when the synchronous rectifying switch Sr is in the sub conducting period, the driving signal CTr is generated based on the method in the present disclosure. Specifically, during the sub conducting period, the driving signal CTr of the synchronous rectifying switch Sr may be enabled or disabled according to the current load state. For example, when the current load is light, the driving signal CTr for the sub conducting period is disabled to reduce the driving loss. The synchronous rectifying switch Sr maintains off, and the current of the secondary winding flows through the parasitic diode of the synchronous rectifying switch Sr.

In summary, in various embodiments of the present disclosure, the processing circuits 150, 170, and 190 may determine whether the synchronous rectifying switch Sr is in the main conducting period or the sub conducting period according to the voltage signal Vds2 and at least one detecting signal from the converter 100. And the processing circuit generates the driving signal CTr correspondingly to control the synchronous rectifying switch Sr. By using the converter of the present disclosure, the issues such as decreasing conversion efficiency and burn-out of the power devices mentioned above can be avoided. The detecting signal may be the voltage signal and/or the current signal from the converter 100, which is not limited thereto. Various detecting signals are possible as long as the synchronous rectifying switch Sr may be determined in the main conducting period or the sub conducting period according to the detecting signal.

In addition, the elements mentioned in the various embodiments, and the processing circuits and functional units in the processing circuits may be achieved by other circuits with the same function. The circuits mentioned above are merely by examples and not meant to limit the present disclosure.

Figure 9:
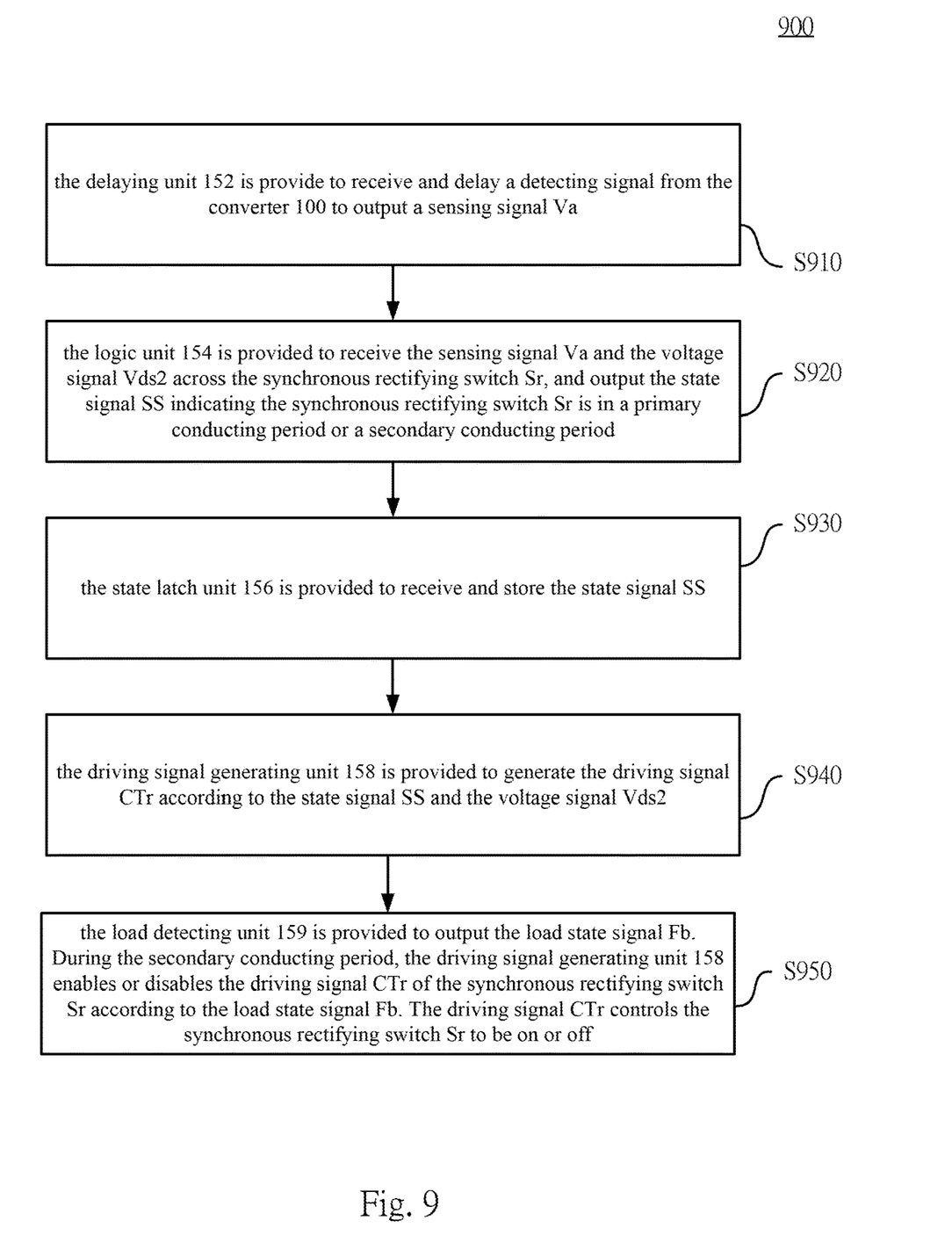
FIG. 9 is a flow chart illustrating a control method according to some embodiments of the present disclosure.

Reference is made to FIG. 9. FIG. 9 is a flow chart illustrating a control method 900 according to some embodiments of the present disclosure. For better understanding of the present disclosure, the control method 900 is discussed in relation to the embodiments shown in FIG. 1-FIG. 8, but is not limited thereto. It will be apparent to those skilled in the art that various modifications and variations can be made without departing from the scope or spirit of the disclosure. As depicted in FIG. 9, the control method 900 includes steps S910, S920, S930, S940, and S950.

First, in the step S910, the delaying unit 152 is provide to receive and delay a detecting signal from the converter 100 to output a sensing signal Va.

Next, in the step S920, the logic unit 154 is provided to receive the sensing signal Va and the voltage signal Vds2 across the synchronous rectifying switch Sr, and output the state signal SS indicating the synchronous rectifying switch Sr is in a main conducting period or a sub conducting period. Next, in the step S930, the state latch unit 156 is provided to receive and store the state signal SS. Next, in the step S940, the driving signal generating unit 158 is provided to generate the driving signal CTr according to the state signal SS and the voltage signal Vds2. Next, in the step S950, the load detecting unit 159 is provided to output the load state signal Fb. During the sub conducting period, the driving signal generating unit 158 enables or disables the driving signal CTr of the synchronous rectifying switch Sr according to the load state signal Fb. The driving signal CTr controls the synchronous rectifying switch Sr to be on or off.

In some embodiments, the step S940 further includes the driving signal generate unit 158 generates corresponding driving signal CTr according to the synchronous rectifying switch Sr in the main conducting period or in the sub conducting period. In some embodiments, when the synchronous rectifying switch Sr is in the sub conducting period, the driving signal CTr is configured with a given pulse width. The synchronous rectifying switch Sr conducts for a given conducting time T. For example, the conducting time T is smaller than or equal to the conducting time of the auxiliary switch Sa. That is to say the pulse width of the driving signal CTr is smaller than or equal to the pulse width of the auxiliary switch driving signal CTa.

Further, in some embodiments, during the sub conducting period, the driving signal CTr has a given pulse width. The given pulse width may be fixed. For example, the given pulse width is smaller than or equal to the pulse width of the auxiliary switch driving signal CTa. The given pulse width may also be adjustable. The given pulse width is adjusted according to actual circumstances, such as the variation of the input voltage Vin and the output voltage Vo.

In some embodiments, the step S950 further includes, during the sub conducting period, when the load state signal Fb indicates the load of the converter is heavy, the driving signal generating unit 158 enables the driving signal CTr. And the driving signal CTr controls the synchronous rectifying switch Sr to conduct for a given conducting time T. When the load state signal Fb indicates the load of the converter is light, the driving signal generating unit 158 disables the driving signal CTr. And the synchronous rectifying switch Sr keeps off during the sub conducting period. In some embodiments, during the sub conducting period, according to actual needs, the driving signal generating unit 158 may also enable the driving signal CTr, when the load of the converter is light. And the driving signal CTr controls the synchronous rectifying switch Sr to conduct for a given conducting time.

In addition, in some embodiments, the step S910 further includes receiving and delaying the voltage signal Vds2 by the delaying unit 152, to output the sensing signal Va. The step S920 further includes comparing the sensing signal Va and the output voltage Vo by the logic unit 154 when the voltage signal Vds2 is negative. When the sensing signal Va is larger than the output voltage Vo, the synchronous rectifying switch Sr is in the main conducting period. And when the sensing signal Va is smaller than the output voltage Vo, the synchronous rectifying switch Sr is in the sub conducting period.

In addition, in some embodiments, the step S910 includes receiving and delaying the main switch control signal CTm by the delaying element 172a to output the sensing signal Vb. And the step S910 further includes receiving and delaying the auxiliary switch control signal CTa by the delaying element 172b, to output the sensing signal Vc. The step S920 further includes comparing the voltage value of the sensing signal Vb with zero and comparing the voltage value of the sensing signal Vc with zero by the logic unit 174 when the voltage signal Vds2 is negative. When the voltage value of the sensing signal Vb is positive, the synchronous rectifying switch Sr is in the main conducting period. And when the voltage values of the sensing signal Vc and the sensing signal Vb are both zero, the synchronous rectifying switch Sr is in the sub conducting period.

In addition, in some embodiments, the step S910 further includes receiving and delaying the auxiliary winding voltage signal Vaux by the delaying unit 192 to output the sensing signal Vd. The step S920 further includes judging the polarity of the sensing signal Vd by the logic unit 194 when the voltage signal Vds2 is negative. When the sensing signal Vd is negative, the synchronous rectifying switch Sr is in the main conducting period. And when the sensing signal Vd is positive, the synchronous rectifying switch Sr is in the sub conducting period.

Those skilled in the art can immediately understand how to perform the operations and functions of the control method 900 based on the converter 100 in the various embodiments described above, and thus a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

In summary, in the present disclosure, the processing circuit is used to determine whether the synchronous rectifying switch is in the main conducting period or the sub conducting period. And the processing circuit correspondingly generates the driving signal to control the synchronous rectifying switch to be on or off. The false operation of the converter can be avoided, and the efficiency and the safety of the converter can increase. At the same time, the loss of the synchronous rectifying switch in the sub conducting period is reduced significantly and the zero voltage turn-on of the main switch is achieved.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A converter comprising:
    a transformer comprising a primary winding and a secondary winding;
    a main switch, electrically coupled to the primary winding;
    an active clamping circuit, configured to clamp the voltage across the main switch, wherein the active clamping circuit comprises an auxiliary switch and a clamping capacitor connected in series, wherein the active clamping circuit is coupled to two terminals of the primary winding in parallel;
    a synchronous rectifying switch, electrically coupled to the secondary winding; and
    a processing circuit, configured to determine whether the synchronous rectifying switch is in a main conducting period or a sub conducting period according to a first voltage signal across the synchronous rectifying switch and at least one detecting signal from the converter, and generate a driving signal to control the synchronous rectifying switch accordingly,
    wherein the processing circuit is further configured to detect a load state of the converter,
    when the load of the converter is in a light state, the processing circuit disables the driving signal to keep the synchronous rectifying switch off during the sub conducting period, and
    when the load of the converter is in a heavy state, the processing circuit enables the driving signal to conduct the synchronous rectifying switch for a given time during the sub conducting period.

2. The converter of claim 1, wherein the processing circuit comprises:
    a delaying unit, configured to receive and delay the at least one detecting signal to output at least one sensing signal;
    a logic unit, configured to receive the at least one sensing signal and the first voltage signal to output a state signal indicating the synchronous rectifying switch is in the main conducting period or the sub conducting period; and
    a state latch unit configured to receive and store the state signal.

3. The converter of claim 2, wherein the processing circuit further comprises a driving signal generating unit, and the driving signal generating unit is configured to generate the driving signal according to the state signal and the first voltage signal to control the synchronous rectifying switch.

4. The converter of claim 3, wherein the processing circuit further includes a load detecting unit, and the load detecting unit is configured to output a load state signal;
    when the synchronous rectifying switch is in the sub conducting period, the driving signal generating unit enables or disables the driving signal according to the load state signal.

5. The converter of claim 4, wherein when the load state signal indicates the load of the converter is in the heavy state, the driving signal generating unit enables the driving signal, and the synchronous rectifying switch conducts for the given time;
    and when the load state signal indicates the load of the converter is in the light state, the driving signal generating unit disables the driving signal, and the synchronous rectifying switch keeps off,
    wherein the given time is smaller than or equal to a conducting time of the auxiliary switch in the sub conducting period.

6. The converter of claim 2, wherein the delaying unit receives the first voltage signal as the detecting signal, and delays the first voltage signal correspondingly to output the sensing signal; and
    the logic unit compares the sensing signal with the output voltage when the first voltage signal is negative, wherein when the first voltage signal is negative and a value of the sensing signal is larger than a value of the output voltage, the synchronous rectifying switch is in the main conducting period, and when the first voltage signal is negative and the value of the sensing signal is smaller than the value of the output voltage, the synchronous rectifying switch is in the sub conducting period.

7. The converter of claim 2, wherein the delaying unit comprises:
   a first delay element configured to receive a main switch control signal as a first detecting signal and delay the main switch control signal correspondingly to output a first sensing signal;
   a second delay element configured to receive an auxiliary switch control signal as a second detecting signal and delay the auxiliary switch control signal correspondingly to output a second sensing signal;
   wherein the logic unit compares a voltage value of the first sensing signal with zero and compares a voltage value of the second sensing signal with zero when the first voltage signal is negative, wherein when the voltage value of the first sensing signal is positive, the synchronous rectifying switch is in the main conducting period, and when the voltage values of the first sensing signal and the second sensing signal are both zero, the synchronous rectifying switch is in the sub conducting period.

8. The converter of claim 7, wherein the processing circuit further comprises an isolating unit connected to the logic unit;
   and the isolating unit is configured to electrically isolate the primary side of the processing circuit and the secondary side of the processing circuit, and transmit the state signal to the secondary side of the converter.

9. The converter of claim 2, wherein the transformer further comprises an auxiliary winding electrically connected to the secondary winding, and an auxiliary winding voltage signal is as the detecting signal.

10. The converter of claim 9, wherein the delaying unit is configured to receive and delay the auxiliary winding voltage signal to output the sensing signal; and
   the logic unit is configured to judge the polarity of the sensing signal when the first voltage signal is negative, wherein when the sensing signal is negative, the synchronous rectifying switch is in the main conducting period, and when the sensing signal is positive, the synchronous rectifying switch is in the sub conducting period.

11. The converter of claim 1, wherein the driving signal for the sub conducting period has a given pulse width.

12. The converter of claim 11, wherein the given pulse width is fixed in order to control the synchronous rectifying switch to conduct for a fixed time.

13. The converter of claim 11, wherein the given pulse width may be adjusted according to actual circumstance.

14. The converter of claim 1, wherein the state of the at least one detecting signal before the synchronous rectifying switch entering the main conducting period is different from the state of the at least one detecting signal before the synchronous rectifying switch entering the sub conducting period.

15. A control method for a converter, wherein the converter includes a transformer comprising a primary winding and a secondary winding; a main switch electrically coupled to the primary winding, an active clamping circuit configured to clamp the voltage across the main switch, wherein the active clamping circuit comprises an auxiliary switch and a clamping capacitor connected in series and the active clamping circuit is coupled to two terminals of the primary winding in parallel, and a synchronous rectifying switch, electrically coupled to the secondary winding, wherein the control method comprises:
   providing a delaying unit to receive and delay at least one detecting signal from the converter to output at least one sensing signal;
   providing a logic unit to receive the at least one sensing signal and a first voltage signal across the synchronous rectifying switch, and output a state signal indicating the synchronous rectifying switch is in a main conducting period or a sub conducting period;
   providing a state latch unit to receive and store the state signal;
   providing a driving signal generating unit to generate a driving signal according to the state signal and the first voltage signal to control the synchronous rectifying switch; and
   providing a load detecting unit to output a load state signal;
   wherein when the load state signal indicates the load of the converter is in a light state, the driving signal generating unit disables the driving signal to keep the synchronous rectifying switch off during the sub conducting period, and
   when the load state signal indicates the load of the converter is in a heavy state, the driving signal generating unit enables the driving signal to conduct the synchronous rectifying switch for a given time during the sub conducting period.

16. The control method of claim 15,
   the given time is smaller than or equal to a conducting time of the auxiliary switch in the the sub conducting period.

17. The control method of claim 15, wherein the step of generating the driving signal to control the synchronous rectifying switch further comprises:
   configuring the driving signal with a given pulse width during the sub conducting period.

* * * * *